Patented Sept. 10, 1935

2,014,230

UNITED STATES PATENT OFFICE 2,014,230

BROWN GLASS BATCH

Kitsuzo Fuwa and Fujio Suzuki, Tokyo, Japan, assignors to General Electric Company, a corporation of New York No Drawing. Application June 8, 1932, Serial No. 616,160. In Japan June 30, 1931

2 Claims. (Cl. 106—36.1)

Our invention relates to the manufacture of glass and more particularly to the manufacture of brown colored glass.

The object of our invention is to provide a composition for a brown colored glass which will have a permanent color and will be substantially free of bubbles. A brown glass is commonly made by adding to a standard glass composition such coloring agents as iron oxide and manganese oxide or sulfur, sulfides or carbon. When iron oxide and manganese oxide are used it is difficult to obtain a glass having a desired tint due to the effect of the high melting temperature on the manganese. The same difficulty is encountered in the use of sulfur, sulfides, or carbon due to the action of arsenious acid and oxidizing agents used therewith.

According to our invention these disadvantages are obviated by adding to an ordinary glass composition 0.5 to 3.0% of ammonium sulfate and 0.5 to 5.0% of an organic substance such as sugar. The said ammonium sulfate is reduced by said organic matter to the sulfide which, together with the carbon in the organic material, acts as coloring agent. A variety of tints of brown glass may be produced by altering the proportion of ammonium sulfate and organic matter. The ammonium sulfate also acts as a fining agent in eliminating bubbles, thereby obviating the use of a separate fining agent which might affect the color of the finished glass.

The following proportions have been found to provide a satisfactory composition:

| | Parts |
|---|---|
| Ammonium sulfate | 1.5 |
| Carbon | 4.5 | which is added to the following ordinary soda glass composition:

| | Parts |
|---|---|
| Silica | 100 |
| Lime | 20 |
| Magnesia | 10 |
| Boric acid | 5 |
| Soda | 50 |

The above mixture when melted will provide a very satisfactory dark brown glass substantially free of bubbles.

What we claim as new and desire to secure by Letters Patent of the United States is:

1. A batch for making brown glass comprising in addition to the ordinary glass composition 0.5 to 3.0% of ammonium sulfate and 0.5 to 5.0% of organic matter.

2. A batch for making brown glass which comprises, in addition to the ordinary glass batch, a mixture of ammonium sulfate to act as a coloring agent and an organic substance to act as a reducing agent for said ammonium sulfate and as a second coloring agent.

KITSUZO FUWA.
FUJIO SUZUKI.